No. 864,100. PATENTED AUG. 20, 1907.
F. T. LERCH.
HAME TUG COUPLING.
APPLICATION FILED APR. 18, 1906.
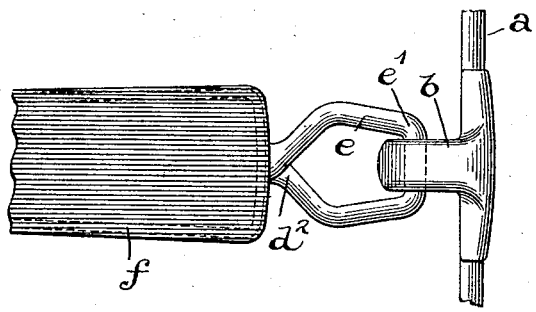
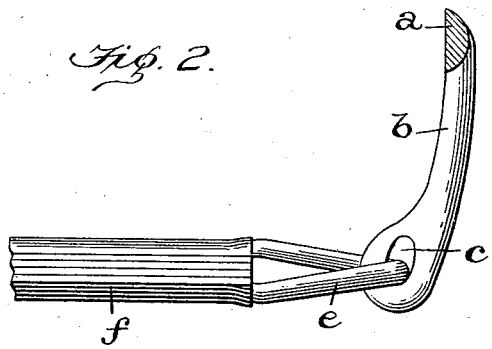
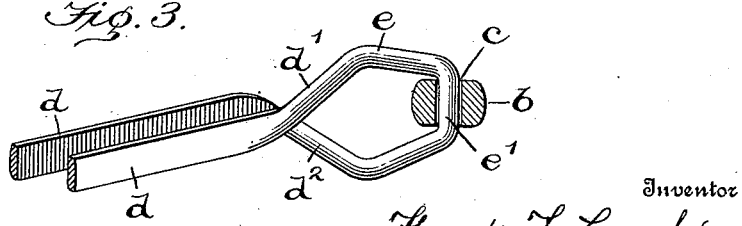

UNITED STATES PATENT OFFICE.

FRANK T. LERCH, OF BALTIMORE, MARYLAND.

HAME-TUG COUPLING.

No. 864,100.  Specification of Letters Patent.  Patented Aug. 20, 1907.

Application filed April 18, 1906. Serial No. 312,300.

*To all whom it may concern:*

Be it known that I, FRANK T. LERCH, a citizen of the United States, residing at Baltimore, in the State of Maryland, have invented certain new and useful Improvements in Hame-Tug Couplings, of which the following is a specification.

This invention relates to an improvement in the construction of the coupling which connects a carriage-harness trace with the hames which are secured on the collar.

In ordinary horse harness used for carriages the clip on the end of the traces which couple with the hames, and the eye in the draft arm of the hames with which the clip engages are of such shape and construction that when the horse and carriage are standing and the traces are slack that part of the traces adjacent the hames will sag or drop down, and by so doing become unsightly and look slovenly.

The object of the present invention is to overcome the objection just named by connecting the trace with the hames by means of an improved coupling which, in the normal position that the parts must assume when a horse and carriage are standing, will sustain the trace adjacent the collar in a horizontal position and prevent it from sagging.

The invention is illustrated in the accompanying drawing in which,—

Figure 1 shows the hame trace and coupling in vertical side elevation. Fig. 2 shows a top view of the same parts, the hame bar being in section and the lateral arm and trace in their operative position. Fig. 3 shows the trace loop in perspective and the eye of the hames in section.

The letter $a$, designates one of the hames bars which in use has vertical position on the horse collar; this bar has the usual lateral draft arm, $b$, for attachment of the trace tug. For the purposes of this improvement the eye or hole, $c$, through the draft arm opens in the vertical direction; this hole is oblong, the longer dimension of the hole extending in the direction of the length of the arm, $b$.

A draft iron comprises two parallel prongs or bars, $d$, which are united by the formation of a clip or loop, $e$, having a substantially square end, $e^1$. The two parallel prongs are somewhat flattened to better fit and be concealed between the plies of leather forming the trace, $f$; the position of the prongs in the trace is such that a rivet through the plies would pass through both prongs. The metal of the clip, $e$, is not flattened like the prongs but is round in cross-section. In the formation of the clip, $e$, one bar, $d$, at the end of the trace inclines upward as at, $d^1$, and the other bar inclines downward as at, $d^2$, and thus the two inclined portions of the clip cross each other. This crossed effect is the same as would be produced if the clip was first formed so that its outline or shape lay flat in the same plane as the two parallel prongs, $d$, and then without changing the position of the prongs the clip should be given a quarter turn relative to the prongs and thereby produce a slight twist which is the crossed effect. This construction of clip insures that the straight end, $e^1$, will have vertical position and in the same plane as the flat side of the leather trace, $f$. The straight end, $e^1$, of the clip occupies the draft eye or hole, $c$, in the draft arm, which eye or hole opens through said arm vertically. It will be observed by reference to Fig. 3 that the thickness of the straight end, $e^1$, of the clip is practically equal to the size of the eye or hole, $c$, crosswise of its narrower dimension.

The figures of the drawing show the normal relation or position of the parts when the harness is in actual use. The trace, $f$, and clip, $e$, extend in a straight horizontal line back from the draft arm, $b$, of the hame and said arm resting against the front of a horse-collar, as will be readily understood, extends in position almost at a right-angle with respect to the line of the clip and trace. In view of this operative relation of the parts, the straight vertical end, $e^1$, of the clip will fill the narrower part of the eye or hole, $c$, in the draft arm and therefore the clip, $e$, and trace, $f$, adjacent the horse-collar will be sustained in a horizontal position, when there is no strain on trace, as while the horse and carriage are standing. While this construction secures the desired object when the harness is in use, the oblong eye or hole, $c$, affords a certain flexibility or movement of the parts when the harness is off the horse and is being handled. When the harness is hung up in the harness room the oblong eye, $c$, in the hame-arm will permit the trace-clip, $e$, to partly turn in the eye and change the position of the straight end, $e^1$, and thereby the traces will be free to hang straight downward instead of being sustained in a horizontal position, as the traces are when on the horse.

Another practical advantage arising in the use of my improved draft eye and clip is that as the clip extends vertically through the eye and at the side of the collar it will not chafe or rub against the collar like clips that are connected horizontally.

Having thus described my invention what I claim as new and desire to secure by Letters Patent is,—

A hame and trace coupling, comprising a trace-clip having a rounded loop provided with a vertical end, $e^1$, and the lateral arm of a hame provided with an oblong eye, $c$, which opens in the vertical direction and with which the said loop engages—the crosswise dimension of the said vertical end of the loop being the same as the crosswise dimension of the said oblong eye in its narrower direction,—the said loop when in one position serving to sustain the trace horizontally, and in another position free to turn in the said eye to allow the trace to hang down.

In testimony whereof I affix my signature in presence of two witnesses.

FRANK T. LERCH.

Witnesses:
I. F. B. HYDE,
WM. B. WEED, Jr.